United States Patent [19]
Kitahara

[11] Patent Number: 5,466,914
[45] Date of Patent: Nov. 14, 1995

[54] RECORDING-REPRODUCING APPARATUS WITH A MECHANISM FOR PREVENTING SUCCESSIVE INSERTION OF TWO CARDS

[75] Inventor: Toshihiro Kitahara, Tokyo, Japan

[73] Assignee: Olympus Optical Co., Ltd., Tokyo, Japan

[21] Appl. No.: 52,164

[22] Filed: Apr. 23, 1993

[30] Foreign Application Priority Data

Apr. 24, 1992 [JP] Japan .................................. 4-132017

[51] Int. Cl.⁶ .................................................. G06K 13/06
[52] U.S. Cl. .................................. 235/483; 235/475
[58] Field of Search ........................ 235/479, 483, 235/486, 449, 441, 475; 360/2; 369/77.1, 77.2

[56] References Cited

U.S. PATENT DOCUMENTS

| 3,850,299 | 11/1974 | Kreitzer | 209/73 |
|---|---|---|---|
| 3,909,595 | 9/1975 | Morello et al. | 235/435 |
| 4,358,103 | 11/1982 | Koike et al. | 235/449 X |
| 4,527,052 | 7/1985 | Kilborn | 235/475 X |
| 5,017,764 | 5/1991 | Hashimoto et al. | 235/454 |
| 5,045,674 | 9/1991 | Mita et al. | 235/439 |
| 5,146,069 | 9/1992 | Orimoto et al. | 235/479 X |

FOREIGN PATENT DOCUMENTS

| 8616359 | 11/1986 | France | 235/486 |
|---|---|---|---|
| 63-7533 | 1/1988 | Japan . | |
| 1-162160 | 11/1989 | Japan . | |
| 2300882 | 12/1990 | Japan . | |
| 528292 | 2/1993 | Japan | 235/449 |

*Primary Examiner*—Donald Hajec
*Assistant Examiner*—Michael G. Lee
*Attorney, Agent, or Firm*—Frishauf, Holtz, Goodman, Langer & Chick

[57] ABSTRACT

An apparatus comprises a lever provided in a housing. The lever has a stop piece on its first end which is located near a card insertion slot. The lever also has contact rollers on its second end which is opposite to the first end. The lever is rotatable around an axis with respect to a card passageway. The axis extends perpendicular to the passageway between the first and second ends. The lever is urged by a tension spring so that the contact rollers can contact a card being transferred in the passageway and that the stop piece cannot block the passageway. If a card is inserted from the insertion slot into the housing and transferred along the passageway, the card abuts the contact rollers to rotate the lever. As a result, the stop piece blocks the passageway to prevent successive insertion of two cards.

6 Claims, 5 Drawing Sheets

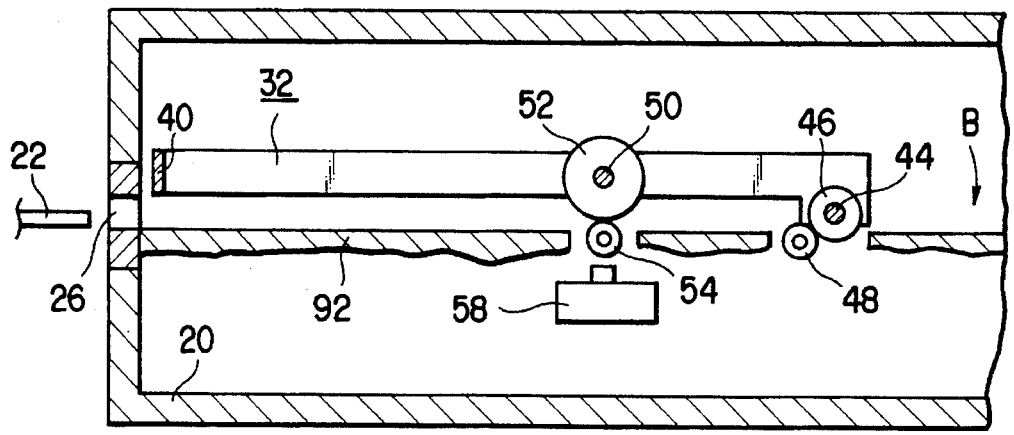
F I G. 4
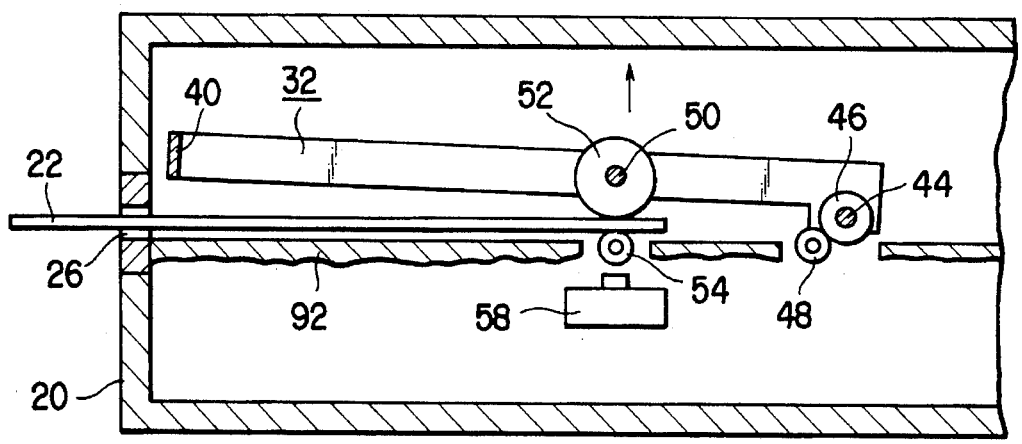
F I G. 5
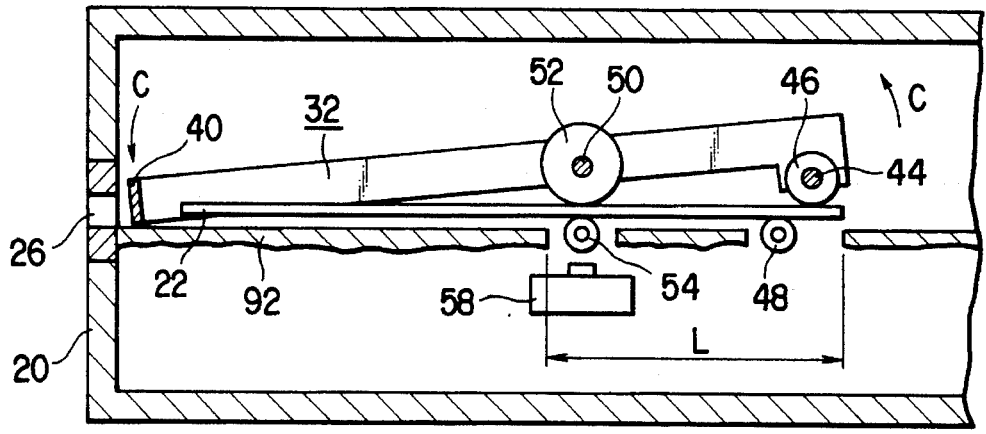
F I G. 6

RECORDING-REPRODUCING APPARATUS WITH A MECHANISM FOR PREVENTING SUCCESSIVE INSERTION OF TWO CARDS

BACKGROUND OF THE INVENTION

1. Field of the Invention

This invention relates to a recording-reproducing apparatus which records and/or reproduces information on and/or from information recording cards by magnetic or optical means or the like, and more particularly to a recording-reproducing apparatus having a function of preventing successive insertion of two information recording cards.

2. Description of the Related Art

An apparatus for recording and reproducing information on and from cards as recording media is required to have means for preventing two cards from being inserted in succession into the apparatus through its card insertion slot. Japanese Laid-open Utility Model Application No. 1-162160 discloses a recording-reproducing apparatus with a mechanism for preventing successive insertion of two cards, which will now be described with reference to FIGS. 1 and 2.

As shown in FIG. 1, a magnetic card 2 which is a kind of information recording card is inserted into a direction X1, as shown by one head of a double-headed arrow, into a recording-reproducing apparatus from its card insertion slot (not shown) and discharged from the apparatus in a direction X2, indicated by the other head of the double-headed arrow.

An arm 4 extends along one side of a card passage-way of the magnetic card 2. The arm 4 is provided on its respective ends with a contact piece 6 and a stop piece 8. The contact piece 6 is disposed at the side of the direction X1 and the stop piece 8 is disposed at the side of the direction X2. On the contact piece 6 is formed a tapered face 10 which can contact a corner of the magnetic card 2. A pin 12 is provided in the portion of the arm 4 between the contact piece 6 and the stop piece 8 such that the arm 4 is supported by the casing so as to be rotatable around the pin 12.

When the magnetic card 2 is inserted into the housing of the apparatus from the card insertion slot, a corner of the magnetic card 2 abuts against the tapered face 10 of the contact piece 6 and the arm 4 is turned around the pin 12 in a direction shown by an arrow A. The stop piece 8 enters the region of the card passageway of the magnetic card 2 and prevents further insertion of another magnetic card into the housing from the card insertion slot. When, therefore, a magnetic card 2 is in the housing, another magnetic card cannot be inserted into the housing, even if the operator tries to do so, whereby successive insertion of two cards into the apparatus is prevented.

In order for the stop piece 8 to prevent successive insertion of two magnetic cards 2 in a normal way, a magnetic card 2 must always be in contact with the contact piece 6. Once the magnetic card 2 is inserted into the housing of the apparatus, however, the card 2 cannot be moved independently in both opposite transfer directions. Accordingly, this mechanism for preventing successive insertion of two cards cannot be applied to a recording-reproducing apparatus in which recording and reproduction of information on and from a card are carried out by moving the card in the opposite transfer directions.

When the operator tries to insert another magnetic card 2 in the housing of the apparatus by mistake in a state in which the stop piece 8 is in a position for preventing insertion of another card, it sometimes happens that the abutment of such another magnetic card 2 against the stop piece 8 causes the arm 4 to be moved in the opposite direction to the direction shown by the arrow A and the contact piece 6 is separated from the corner of such another magnetic card 2. The separation of the contact piece 6 from the magnetic card 2 makes unstable the crosswise support of the magnetic card 2 on which information is being recorded or from which information is being reproduced. Unstable support of the card in the direction of width of the card adversely affects the accuracy of the linear movement of the magnetic card. In particular, optical cards must be moved linearly at a very high accuracy during recording and reproduction of information. Thus, unstable support of the card in its width direction sometimes makes the recording and reproduction impossible.

SUMMARY OF THE INVENTION

The object of this invention is to provide a recording-reproducing apparatus in which successive insertion of two cards is prevented and in which a card in the housing is transferred stably even if the operator tries to insert another card successively into the housing from the card insertion slot of the apparatus by mistake.

In order to achieve the object, this invention provides a recording-reproducing apparatus for transferring an information recording card along a card passageway having a proximal end and a distal end and for recording and/or reproducing information on and/or from the information recording card, comprising a housing having a card insertion slot defining the proximal end of the card passageway, means for transferring the information recording card along the card passageway, a head movable across the card passageway, for recording and/or reproducing information on and/or from the information recording card, a lever having a first end faced to the card insertion slot and a second end faced to the distal end of the card passageway, the lever being rotatable between a first angle and a second angle with respect to the card passageway and rotatable around an axis extending perpendicularly to the card passageway and disposed between first and second ends, means for urging the lever to the first angle, a contact member abutting against the information recording card which is being transferred along the card passageway, for rotating the lever from the first angle to the second angle, and a stop provided on the first end of the lever, the stop being disposed in the card passageway when the lever is at the second angle, to prevent two information recording cards from being inserted in succession into the housing from the card insertion slot.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 4 is a longitudinal cross-sectional view of the mechanism of FIG. 3, in which an optical card is not inserted into the housing of the apparatus;

FIG. 5 is a longitudinal cross-sectional view of the mechanism of FIG. 3, in which an optical card is inserted into the housing of the apparatus;

FIG. 6 is a longitudinal cross-sectional view showing the starting position of a reciprocation area in which the optical card is reciprocated;

DETAILED DESCRIPTION OF THE PREFERRED EMBODIMENTS

Figure 1:
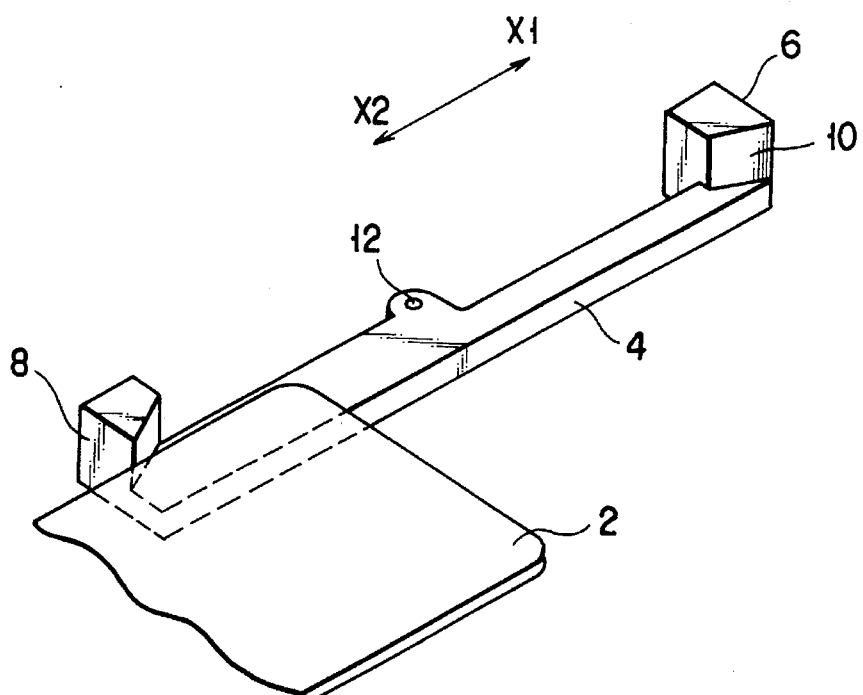
FIG. 1 is a perspective view of the mechanism provided in a conventional recording-reproducing apparatus, for preventing successive insertion of two cards, in a state in which a card is inserted into the housing of the apparatus.
Figure 2:
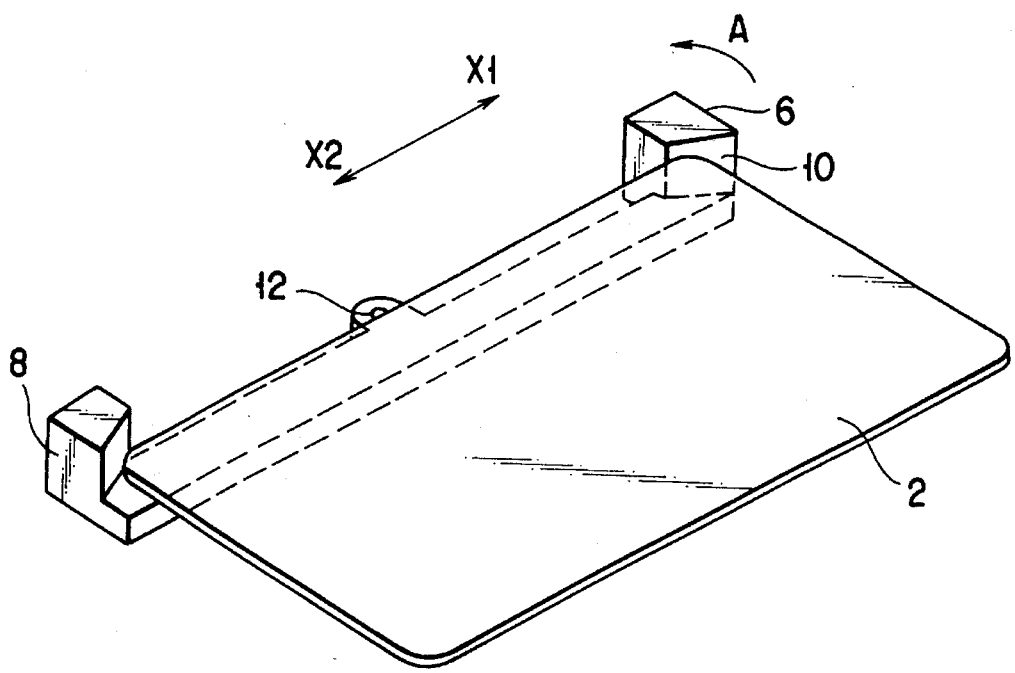
FIG. 2 is a perspective view of the mechanism shown in FIG. 1, in a state in which a card has been inserted into the housing of the apparatus.

Referring FIGS. 3 to 8, one embodiment of the recording-reproducing apparatus will now be described. In the description, the right side and the left side when viewing a housing 20 from a card insertion slot 26 of the apparatus are called the "right" side and the "left" side, respectively, and the distal end 28 side and the proximal end side of a card passageway 24 are called the "rear" side and the "front" side, respectively.

The information recording-reproducing apparatus of this embodiment has a housing 20. Defined in the housing 20 is the card passageway 24 on and along which an optical card 22, a kind of information recording card, is moved. The card insertion slot 26 is formed on the housing 20. The slot 26 allows the optical card 22 to be inserted from the exterior of the housing 20 into the card passageway 24. The card passageway 24 has a proximal end portion which has the card insertion slot 26, and a distal end portion 28 which is disposed opposite to the proximal end portion.

A detector 30 for detecting the insertion and discharge of an optical card 22 is provided close to the card insertion slot 26 and below the card passageway 24.

As disclosed in Japanese Laid-open Patent Application No. 63-7533, the optical card 22 has a recording section divided into two recording areas in its longitudinal direction. When this type of card is used, the reciprocating length of the card on the card passageway becomes half a length of the card. Thus, the apparatus can be made small.

In the housing 20 is provided a U-shaped lever 32 which has two arms 34 and 36 extending along the respective sides of the card passageway 24. The end portions of the arms 34 and 36 at the side of the card entrance 26, i.e., first ends 38 are bridged by a stop piece 40 which can be disposed so as to block the card passageway 24.

A driven shaft 44 is rotatably supported on the end portions of the arms 34 and 36 at the side of the distal end 28 of the card passageway 24, i.e., second end portions 42. On the driven shaft 44 is fixed two contact rollers 46 which can be abutted against the optical card which is transferred along the card passageway 24. As shown in FIG. 4, two first rotatable holding rollers 48 are disposed slightly in front of and under the contact rollers 46. When the optical card 22 is not in the housing 20, the first holding rollers 48 are in contact with the contact rollers 46.

Figure 3:
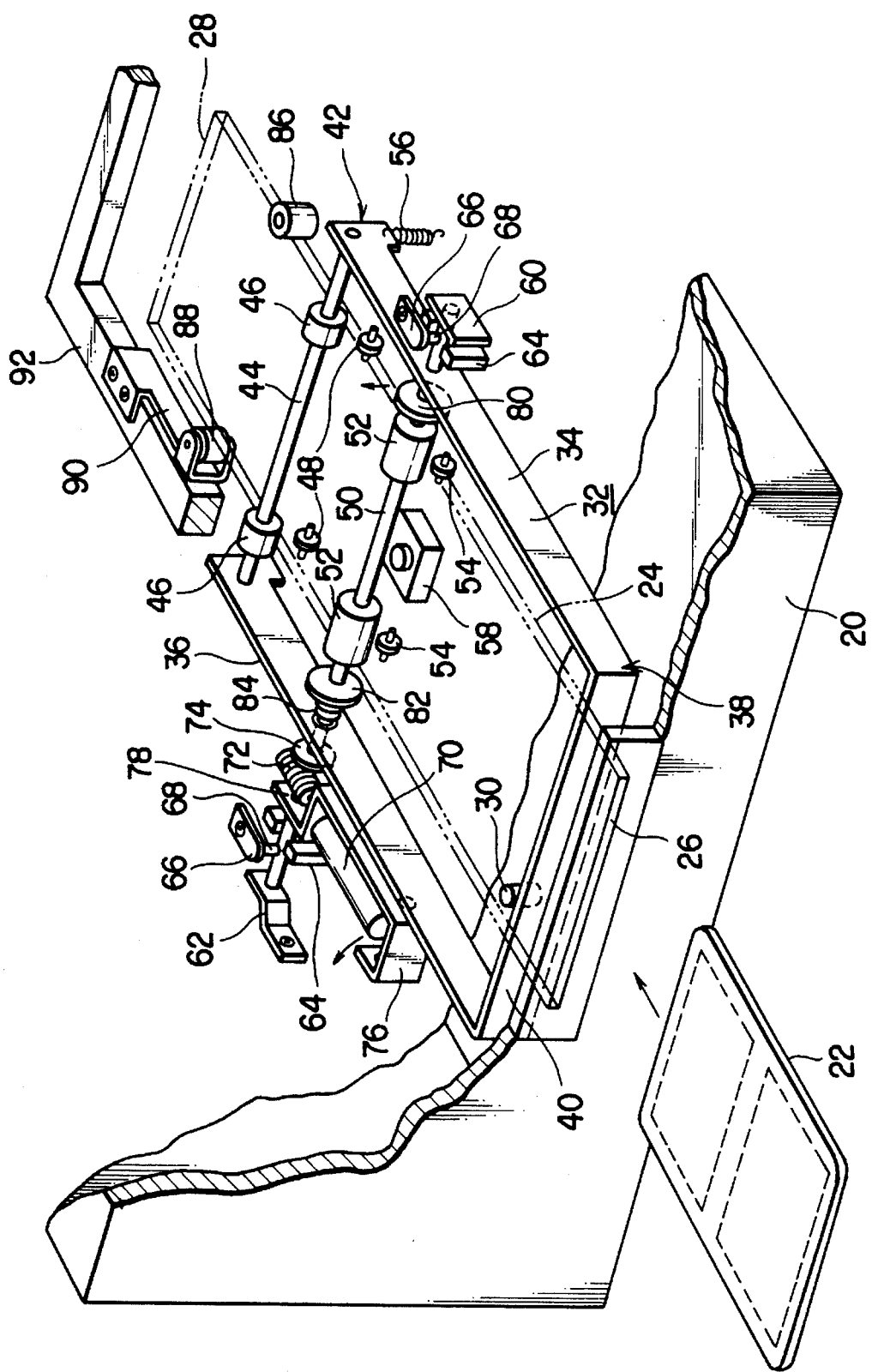
FIG. 3 is a perspective view of the internal mechanism of one embodiment of the recording-reproducing apparatus according to this invention.

As shown in FIG. 3, a drive shaft 50 extends perpendicularly to the arms 34 and 36 and passes through them. The drive shaft 50 is located between the first end portion 38 and the second end portion 42 of each of the arms 34 and 36. The drive shaft 50 is rotatable with respect to the lever 32.

Two cylindrical drive rollers 52 made of material having a high frictional force and a high wear resistance such as neoprene or EPDM are coaxially fixed to drive shaft 50 by adhesion, welding or the like.

Two second holding rollers 54 are rotatably supported to the housing 20 under the drive rollers 52 and are in contact with the drive rollers 52 when there is no card in the housing 20.

One end of a tension spring 56 is connected to the second end 42 of the right arm 34 and the other end of the tension spring 56 is connected to the housing 20.

As shown in FIG. 4, the lever 32 is urged by the tension spring 56 so as to be rotated around the drive shaft 50 in the direction shown by an arrow B. When the optical card 22 is not in the housing 20, therefore, the stop piece 40 does not block the way to the card insertion slot 26.

An optical head 58 is provided in the housing 20 below the drive shaft 50 so as to be movable along the axial direction of the drive shaft 50. The optical head 58 records and reproduces information on and from the desired tracks of the card 22. The right end face of the drive shaft 50 abuts against a limiting plate 60 provided in the housing 20, for limiting the axial movement of the drive shaft 50. The left end face of the drive shaft 50 abuts against a first plate spring 62 provided in the housing 20, for urging the drive shaft 50 toward the limiting plate 60.

On the inner sides of the limiting plate 60 and the first plate spring 62 are provided two U-shaped guides 64 having an open upper portion and each having a bottom portion fixed to the housing 20. The drive shaft 50 is idly inserted into the guides 64 such that its forward, rearward and downward movements can be restricted.

A gear 74 which is in engagement with the worm gear 72 of a motor 70 is coaxially provided on the drive shaft 50 at the right side of the left second plate spring 66. The motor 70 is electrically connected to the detector 30 through a driving circuit (not shown) and is controlled by the detector 30 and the driving circuit.

The motor 70 is fixed to a motor plate 76 having a front end formed with a through hole 78. The drive shaft 50 is inserted into the through hole 78 such that the relative position between the drive shaft 50 and the motor 70 is determined. In this arrangement, the motor 70 and the drive roller 52 are moved together so that the gear space between the worm gear 72 and the gear 74 is retained constant.

A disc-like fixed flange 80 is coaxially fixed to the drive shaft 50 between the right arm 34 and the right drive roller 52. A holding flange 82 is provided on the drive shaft 50 between the left arm 36 and the left drive roller 52 so as to be movable on the drive shaft 50 in its axial directions.

On the portion of the drive shaft 50 at the right side of the left drive roller 52 is provided a stop (not shown) for limiting the rightward movement of the holding flange 82. The stop is placed at such a position that the optical card 22 is transferred with its both side portions thereof being held between the fixed flange 80 and the holding flange 82. Between the left arm 36 and the holding flange 82 is provided a spiral spring 84 for urging the holding flange 82 to the right side.

A cylindrical reference roller 86 and a cylindrical urging roller 88 are provided behind the lever 32 so as to be rotatable around their vertical axes. The reference roller 86 and the urging roller 88 are placed at the right side and the left side of the card passageway 24, respectively.

The reference roller 86 is positioned in such a way that the left side portion of the outer peripheral surface of the roller 86 coincides with the right edge of the card passageway 24. The distance between the outer peripheral surface of the reference roller 86 and the outer peripheral surface of the urging roller 88 is narrower than the width of the optical card 22. The urging roller 88 is supported by a plate spring 90 fixed to an apparatus frame 92.

In this recording-reproducing apparatus, an optical card 22 is inserted into the housing 20 from the card insertion slot 26 and moved back and forth on the card passageway 24 according to the rotation of the drive shaft 50 and the drive rollers 52. As shown in FIG. 6, the card passageway 24 has an area L in which an optical card 22 always exists. The two drive rollers 52, the two contact rollers 46, the first and second holding rollers 48 and 54 and the optical head 58 which are important members for effecting recording and reproduction of information on and from the optical card 22 are arranged in the area L. Since these important members are arranged in the area L, the transfer of the optical card, recording and reproduction of information can be carried out stably.

The operation of the recording-reproducing apparatus according to this invention will now be described.

When the optical card 20 is not in the housing 20 as shown in FIG. 4, the lever 32 is urged in the direction of the arrow B by the tension spring 56 (shown in FIG. 3) and is held substantially horizontally. Thus, the card insertion slot 26 is opened.

Upon being inserted from the slot 26, the optical card 22 is detected by the detector 30 as shown in FIG. 3 and the motor 70 begins to be driven by means of the driving circuit (not shown). The rotation of the worm gear 72 connected to the rotary shaft of the motor 70 is transmitted to the drive shaft 50, and both the drive shaft 50 and the drive rollers 52 are rotated.

As the optical card 22 is further inserted, the front end portion of the optical card 22 is held by the drive rollers 52 and the second holding rollers 54 as shown in FIG. 5, and the drive rollers 52 are lifted by an amount equal to the thickness of the optical card 22 (substantially 0.7 to 0.8 mm) such that the contact rollers 46 are retained in contact with the first holding rollers 48.

As the optical card 22 advances further along the card passageway by the rotation of the drive rollers 52, the front end portion of the optical card 22 is held by the contact rollers 46 and the first holding rollers 48, and the contact rollers 46 are lifted as shown in FIG. 6. As a result, the lever 32 is rotated around the drive shaft 50 against the urging force of the tension spring 56 (shown in FIG. 3) in the direction shown by an arrow C. By this rotation, the stop piece 40 blocks the way to the slot 26, thereby preventing successive insertion of the optical card 22 into the housing 20.

Figure 7:
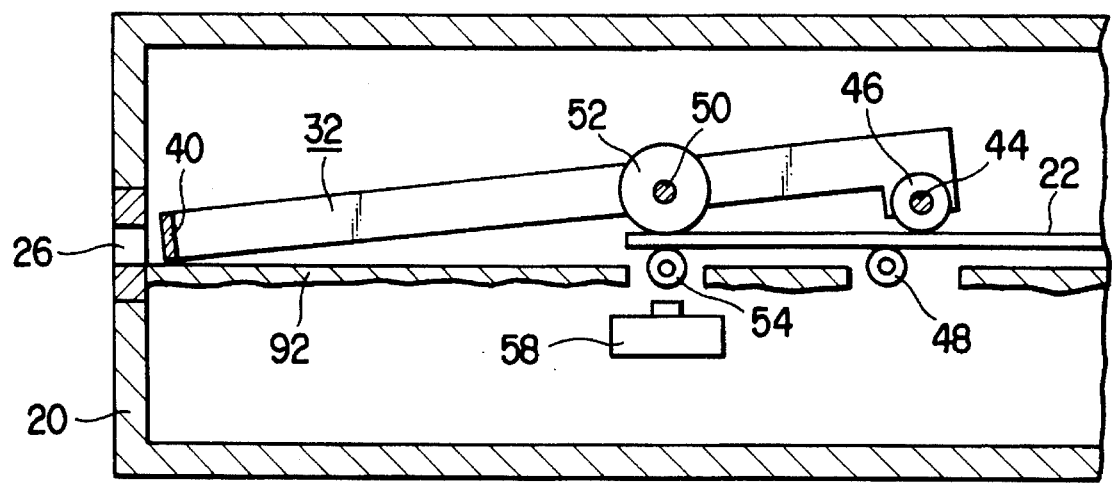
FIG. 7 is a longitudinal cross-sectional view showing the ending position of the reciprocation area.

Thereafter, while the optical card 22 is reciprocated between the positions shown in FIGS. 6 and 7, information is recorded on the optical card 22 and is read out therefrom.

Figure 8:
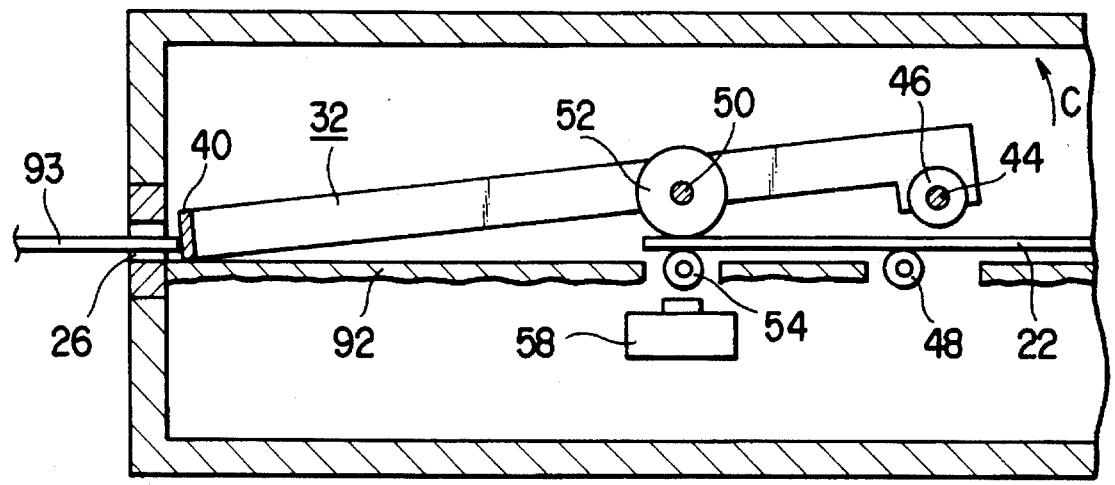
FIG. 8 is a longitudinal view showing the state in which the operator tries to insert another optical card into the housing by mistake.

When the operator tries to insert another optical card 93 into the housing while the optical card 22 is in the housing 20, as shown in FIG. 8, such another optical card 93 hits against the stop piece 40, which blocks the way to the slot 26, and is prevented from being inserted. The optical card 93 hitting against the stop piece 40 rotates the lever 32 in the direction shown by the arrow C further from the position as shown in FIG. 7, and the contact rollers 46 are separated from the optical card 22 in the housing 20. However, the optical card 22 in the housing 22 is held and moved by the drive rollers 52 and the second rollers 54 without fail, whereby stable continuous recording and reproduction are ensured.

In the apparatus of this embodiment, a card can be independently transferred in the housing while preventing successive insertion of another card. Therefore, this invention can be applied to an apparatus for recording and reproducing information on and from a card which requires reciprocal movements when recording and reproduction of information are performed. Even if the operator tries to insert another card into the housing by mistake when a card is in the housing, such another card is not accepted by the apparatus. This ensures stable recording and reproduction of information in the card in the apparatus.

A modification of the lever 32 will now be described.

Figure 9:
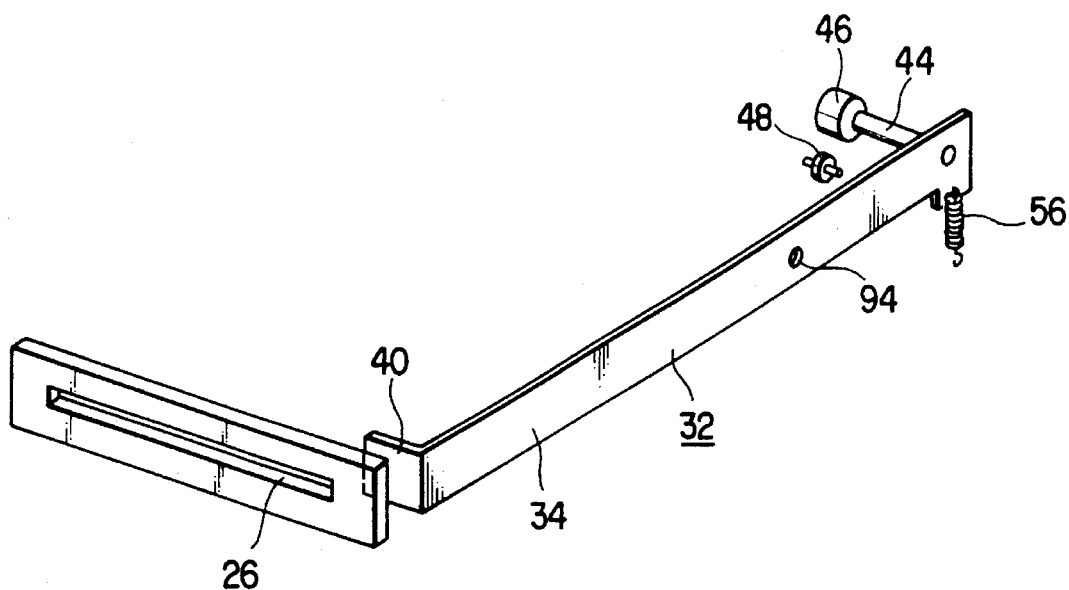
FIG. 9 is a perspective view of a modification of the lever.

The lever 32 of the above-described embodiment has two arms 34 and 36. Instead, the modified lever 32 has only the right arm 34 and its stop piece 40 is shorter than that of the above-mentioned embodiment as shown in FIG. 9. In the above-described embodiment, the drive shaft 50 (shown in FIG. 3) extends through the arm 34. In the modification, however, the arm 34 is formed with a small hole 94 in which a pin (not shown) fixed to the housing 20 (shown in FIG. 3) is fitted such that the arm 34 is rotatable about the pin. The modification has one contact roller 46 and one first holding roller 48, not two contact rollers and two holding rollers.

Since it is unnecessary that the modified lever 32 be connected to the housing 20 by means of the drive shaft 50, adverse effects on the reciprocal movements of the card in the housing can be reduced when the operator tries to insert another card in the apparatus by mistake and abuts against the stop piece 40.

Figure 10:
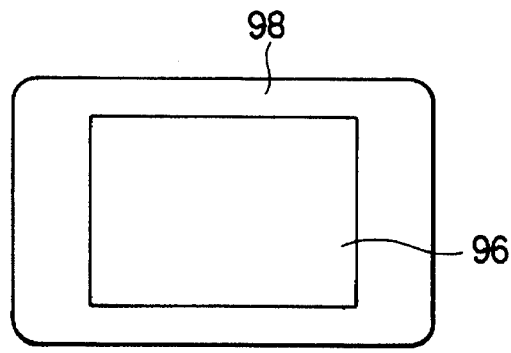
FIG. 10 is a plan view of another type of the optical card.
Figure 11:
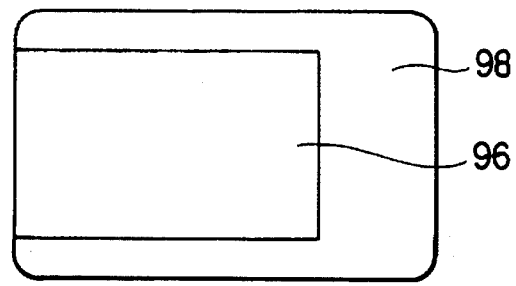
FIG. 11 is a plan view of a further type of the optical card.

The optical cards each having a recording portion divided into two recording areas in the longitudinal direction are used in the above described embodiment. However, the optical cards are not limited thereto, as long as a recording area or areas exist in the region L as shown in FIG. 6. For example, the optical card 98 may have an undivided, single recording area 96 formed in the central portion of the card as shown in FIG. 10 or a recording area 96 not formed in its central portion but extending from one end toward the other end of the optical card as shown in FIG. 11.

As described above, with the apparatus according to this invention, the card inserted into the apparatus can be moved back and forth in the housing and another card is prevented from being inserted into the apparatus when the previous card is still in the housing. Therefore, optical cards can be used in the apparatus and two cards are prevented from entering the apparatus at the same time, ensuring stable transfer of the cards in the apparatus.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A recording-reproducing apparatus for transferring an information recording card along a card passageway having a proximal end and a distal end, and for recording and/or reproducing information on and/or from said information recording card, the apparatus comprising:

a housing having a card insertion slot defining said proximal end of said card passageway;

transferring means for transferring said information recording card along said card passageway;

a head movable across said card passageway, for recording and/or reproducing information on and/or from said information recording card;

a lever having a first end facing said card insertion slot and a second end facing said distal end of said card passageway, said lever being rotatable in a vertical direction between respective positions having a first angle and a second angle with respect to said card passageway and said lever being vertically rotatable around a substantially horizontal axis extending substantially perpendicularly to said card passageway, and said axis being disposed between said first and second ends of said lever;

means for urging said lever to said first angle position at which said first end of said lever does not block said card insertion slot;

said transferring means including a motor which is operative responsive to the presence of said card in said card passageway for reciprocally transferring said card along said passageway said lever remaining in said second angle position during said reciprocal transferring;

a contact member provided on said second end of said lever, said contact member being arranged to abut against said information recording card which is being transferred along said card passageway, for vertically rotating said lever from said first angle position to said second angle position, against an urging force of said urging means, when said contact member is contacted by and moved by said card which is being transferred along said card passageway; and a stop member provided on said first end of said lever, said stop member being disposed on said first end of said lever so as to block said card passageway when said lever is vertically rotated to be at said second angle position, for thereby preventing insertion of a further information recording card into said insertion slot, thus preventing two information recording cards from being inserted in succession into said housing from said card insertion slot.

2. The apparatus according to claim 1, wherein:

said transferring means comprises rollers for transferring said information recording card in contact therewith; and said rollers of said transferring means, said contact member and said head are arranged in an area in which at least a part of said information recording card is always located when recording and/or reproducing of information are or is carried out.

3. The apparatus according to claim 1, wherein said contact member is in contact with said information recording card so as to enable said information recording card to move in said card passageway, whereby said lever is supported at said second angle position.

4. The apparatus according to claim 3, wherein said transferring means transfers said information recording card in forward and backward directions along said card passageway.

5. The apparatus according to claim 1, wherein said contact member includes at least one roller.

6. The apparatus according to claim 1, wherein said transferring means transfers said information recording card in forward and backward directions along said card passageway.

* * * * *